(12) United States Patent
Zha

(10) Patent No.: US 11,249,231 B2
(45) Date of Patent: Feb. 15, 2022

(54) OPTICAL PURIFICATION LAYER, EDGE-LIT BACKLIGHT MODULE AND POLARIZER

(71) Applicant: TCL CHINA STAR OPTOELECTRONICS TECHNOLOGY CO., LTD., Guangdong (CN)

(72) Inventor: Bao Zha, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 181 days.

(21) Appl. No.: 16/620,740

(22) PCT Filed: Nov. 26, 2019

(86) PCT No.: PCT/CN2019/120795
§ 371 (c)(1),
(2) Date: Dec. 9, 2019

(87) PCT Pub. No.: WO2021/093018
PCT Pub. Date: May 20, 2021

(65) Prior Publication Data
US 2021/0294010 A1 Sep. 23, 2021

(30) Foreign Application Priority Data
Nov. 14, 2019 (CN) .......................... 201911111411.7

(51) Int. Cl.
*G02B 5/22* (2006.01)
*G02B 1/14* (2015.01)
(Continued)

(52) U.S. Cl.
CPC ............ *G02B 5/223* (2013.01); *C09B 47/085* (2013.01); *G02B 1/14* (2015.01); *G02B 5/003* (2013.01);
(Continued)

(58) Field of Classification Search
CPC ...... G02B 5/223; G02B 5/3041; G02B 5/003; G02B 6/0031; G02B 6/0051;
(Continued)

(56) References Cited

U.S. PATENT DOCUMENTS

| | | |
|---|---|---|
| 2008/0096999 A1 | 4/2008 | Hirata et al. |
| 2013/0100381 A1 | 4/2013 | Hu et al. |

(Continued)

FOREIGN PATENT DOCUMENTS

| | | |
|---|---|---|
| CN | 1993429 A | 7/2007 |
| CN | 102537775 A | 7/2012 |

(Continued)

*Primary Examiner* — Balram T Parbadia

(57) ABSTRACT

The present invention provides an optical purification layer, an edge-lit backlight module, and a polarizer. The material of the optical purification layer includes an organic absorbing dye for absorbing cyan light and yellow orange light having a wavelength range of 560-610 nm. The edge-lit backlight module includes a back plate, a reflector, a light guide plate, an edge light source, and an optical film module stacked, wherein the optical purification layer is provided between the edge light source and the light guide plate, or the optical purification layer is further provided between the light guide plate and the diffuse reflection layer, or the light guide plate includes a material of the optical purification layer.

11 Claims, 1 Drawing Sheet

(51) Int. Cl.
*C09B 47/08* (2006.01)
*G02B 5/00* (2006.01)
*G02B 5/30* (2006.01)
*F21V 8/00* (2006.01)

(52) U.S. Cl.
CPC ......... *G02B 5/3041* (2013.01); *G02B 6/0031* (2013.01); *G02B 6/0051* (2013.01); *G02B 6/0053* (2013.01); *G02B 6/0055* (2013.01)

(58) Field of Classification Search
CPC ...... G02B 6/0055; G02B 1/14; G02B 6/0053; G02B 6/0056; G02B 6/0083; G02B 6/0086; G02B 6/0026; G02B 5/22; C09B 47/085; G02F 1/133514; G02F 1/133615
See application file for complete search history.

(56) References Cited

U.S. PATENT DOCUMENTS

2016/0197309 A1* 7/2016 Drolet ................. H01L 51/5281
257/40
2016/0349573 A1* 12/2016 Ohmuro ................. G02B 5/305
2019/0113664 A1* 4/2019 Yoshikawa .......... G02B 5/0231

FOREIGN PATENT DOCUMENTS

| CN | 105158963 A | 12/2015 |
|---|---|---|
| CN | 106405937 A | 2/2017 |
| CN | 106773321 A | 5/2017 |
| CN | 106813164 A | 6/2017 |
| CN | 107272338 A | 10/2017 |

* cited by examiner

OPTICAL PURIFICATION LAYER, EDGE-LIT BACKLIGHT MODULE AND POLARIZER

BACKGROUND OF INVENTION

Field of Invention

The present invention relates to a field of display, in particular to an optical purification layer, an edge-lit backlight module and a polarizer.

Description of Prior Art

Development of display technology is also a pursuit of color reproduction capabilities, and from the first generation of sRGB color gamut to the DCI-P3 color gamut for digital cinema, even to the next generation of BT.2020, the color gamut is gradually improving.

At present, color performance of most liquid crystal displays is concentrated in the sRGB chroma specification, and a transition process to the DCI-P3 specification is slowly presented. Currently, quantum dots are required to achieve the color performance of 99% DCI-P3 specification, and ordinary LED backlights still can't reach this specification. Meanwhile, many factors of the quantum dots such as heavy metals contained in the quantum dots, light conversion efficiency, and cost have been always the bottleneck restricting the development of the DCI-P3 (99%) with higher chroma specifications for liquid crystal displays.

SUMMARY OF INVENTION

An object of the present invention is to provide an optical purification layer, an edge-lit backlight module, and a polarizer, which can purify light by absorbing cyan light and yellow orange light through the optical purification layer, which is beneficial to achievement of the DCI-P3 chroma specification. Therefore, a wide color gamut can be realized, the color gamut can achieve 90%-99% of the DCI-P3 color gamut, and the liquid crystal display can achieve ultimate colors.

In order to achieve the above object, the present invention provides an optical purification layer including an organic absorbing dye for absorbing cyan light and yellow orange light of wavelengths ranging from 560 nm to 610 nm.

Further, the organic absorbing dye includes a phthalocyanine-based dye having the following chemical structural formula:

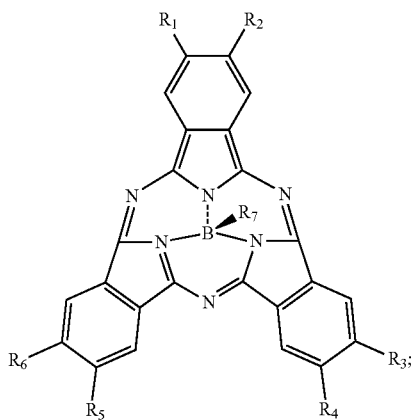

wherein any one of R1-R7 is any one of F, Cl, Br, I or CN; or any one of R1-R7 is any one of $ClO_4^-$, $CF_3SO_3^-$, $CF_2HSO_3^-$, or $CFH_2SO_3^-$; or any one of R1 to R7 is a non-conjugated structure, including any one of a linear alkane, a branched alkane, an alkoxy group-containing linear or branched alkane, an ester group-containing chain, and an F-substituted alkane derivative; or any one of R1 to R7 is a conjugated structure bonded through an alkoxy group and an ester group, and the conjugated structure contains a heterocyclic compound including a five-membered heterocyclic compound, a six-membered heterocyclic compound, a benzoheterocyclic compound, and a fused ring heterocyclic compound, wherein the five-membered heterocyclic compound includes furan, thiophene, pyrrole, thiazole or imidazole, the six-membered heterocyclic compound includes pyridine, pyrazine, pyrimidine or pyridazine, and the fused ring heterocyclic compound includes indole, quinoline, pteridine or acridine.

Further, the optical purification layer is prepared by uniformly dispersing the phthalocyanine dye in a photoresist-like mixture composed of an acrylic resin, an acrylic monomer, and a photoinitiator or in a pressure-sensitive adhesive.

Further, the optical purification layer is prepared by scraping or coating.

Further, the optical purification layer has a film thickness ranging from 500 nm to 20,000 nm.

The present invention also provides an edge-lit backlight module, including: a back plate; a reflector disposed on the back plate; a light guide plate disposed on the reflector, and a lower surface of the light guide plate is provided with a diffuse reflection layer; an edge light source disposed on the back plate and disposed on a side of the light guide plate, wherein the edge light source has a light-exiting surface facing the light guide plate for providing a light source; and an optical film module disposed on the light guide plate, wherein the optical purification layer is provided between the edge light source and the light guide plate, or the optical purification layer is further provided between the light guide plate and the diffuse reflection layer, or the light guide plate includes a material of the optical purification layer.

Further, the edge light source includes: a substrate; a flexible circuit board disposed on a side of the substrate facing the light guide plate; a light-emitting chip disposed on a side of the flexible circuit board facing away from the substrate; and a quantum dot light-emitting layer disposed on a side of the light-emitting chip facing away from the flexible circuit board.

Further, the edge-lit backlight module further includes: a light source reflector disposed above a conjunction between the edge light source and the light guide plate for reflecting light of the edge light source; and a light shading glue disposed above the edge light source and extending to cover an upper surface of the back plate, the light source reflector, and a portion of the optical film module.

Further, the optical film module includes: a diffusor disposed on the light guide plate; a lower brightness enhancement sheet disposed on the diffusor; and an upper brightness enhancement sheet disposed on the lower brightness enhancement sheet.

The present invention also provides a polarizer, including: a stripping protection film; an adhesive layer disposed on the stripping protection film; a first protection layer disposed on the adhesive layer; a polarizing sub-layer disposed on the first protection layer; a second protection layer disposed on the polarizing sub-layer; and a surface protection film disposed on the second protection layer, wherein the optical purification layer according to claim 1 is provided between any two of adjacent ones of the layers.

The present invention has beneficial effects of providing an optical purification layer, an edge-lit backlight module, and a polarizer, which can purify light by absorbing cyan light and yellow orange light through the optical purification layer, which is beneficial to achievement of the DCI-P3 chroma specification. Therefore, a wide color gamut can be realized, the color gamut can achieve 90%-99% of the DCI-P3 color gamut, and a simple process and a low cost are realized. A thermal stability of the optical purification layer is high, and introduction of the optical purification layer is a simple and feasible method for realization of the liquid crystal displays achieving ultimate colors.

Figure 1:
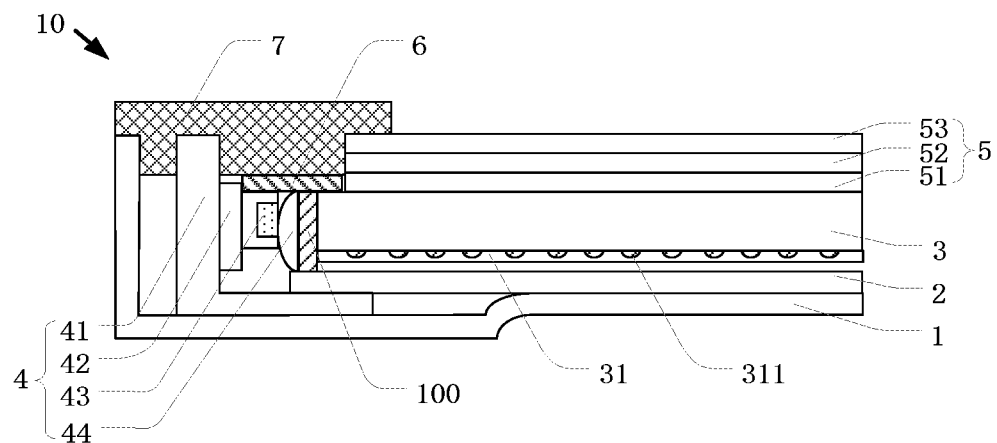
FIG. 1 is a schematic structural diagram of an edge-lit backlight module according to an embodiment of the present invention.

Elements in the drawings are designated by reference numerals listed below.
1, back panel; 2, reflector; 3, light guide; 4, edge light source;
5, optical film module; 6, light source reflector; 7, light-shield;
10, edge-lit backlight module; 20, polarizer; 21, stripping protection film;
22, adhesive layer; 23, first protection layer; 24, polarized photo layer;
25, second protection layer; 26, surface protection film; 31, diffuse reflection layer;
311, dot; 41, substrate; 42, flexible circuit board;
43, light-emitting chip; 44, quantum dot luminescent layer; 51, diffuser;
52, lower brightness enhancement; 53, upper brightness enhancement; 100, optical purification layer.

DETAILED DESCRIPTION OF PREFERRED EMBODIMENTS

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the figures, structurally similar elements are denoted by the same reference numerals.

In the description of the present invention, it should be noted that the terms "installation", "connection", and "bonding" are to be understood broadly unless otherwise explicitly defined and limited. For example, it may be fixed connection, detachable connection, or integrally connection; being mechanical or electrical connection; also, being directly connection, indirectly connection through an intermediate medium, or internal communication of two components. The specific meaning of the above terms in the present invention can be understood in a specific case by those skilled in the art.

In an embodiment of the present invention, an optical purification layer is provided, including an organic absorbing dye for absorbing cyan light and yellow orange light of wavelengths ranging from 560 nm to 610 nm.

In this embodiment, the organic absorbing dye includes a phthalocyanine-based dye having the following chemical structural formula:

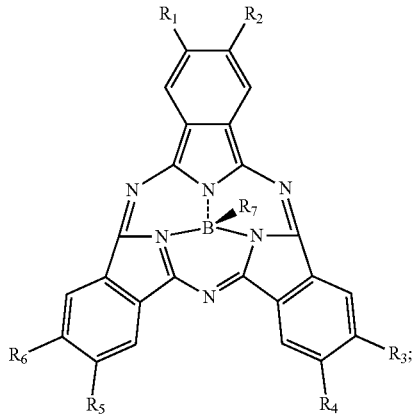

wherein any one of R1-R7 is any one of F, Cl, Br, I or CN; or any one of R1-R7 is any one of $ClO_4^-$, $CF_3SO_3^-$, $CF_2HSO_3^-$, or $CFH_2SO_3^-$; or any one of R1 to R7 is a non-conjugated structure, including any one of a linear alkane, a branched alkane, an alkoxy group-containing linear or branched alkane, an ester group-containing chain, and an F-substituted alkane derivative; or any one of R1 to R7 is a conjugated structure bonded through an alkoxy group and an ester group, and the conjugated structure contains a heterocyclic compound including a five-membered heterocyclic compound, a six-membered heterocyclic compound, a benzoheterocyclic compound, and a fused ring heterocyclic compound, wherein the five-membered heterocyclic compound includes furan, thiophene, pyrrole, thiazole or imidazole, the six-membered heterocyclic compound includes pyridine, pyrazine, pyrimidine or pyridazine, and the fused ring heterocyclic compound includes indole, quinoline, pteridine or acridine.

In this embodiment, the optical purification layer is prepared by uniformly dispersing the phthalocyanine dye in a photoresist-like mixture composed of an acrylic resin, an acrylic monomer, and a photoinitiator or in a pressure-sensitive adhesive.

In this embodiment, the optical purification layer is prepared by scraping or coating. Specifically, the photo-purifying layer is prepared by scraping a mixture of the phthalocyanine dye and the pressure-sensitive adhesive or coating a mixture of the phthalocyanine dye and the photoresist-like mixture.

In this embodiment, the optical purification layer has a film thickness ranging from 500 nm to 20,000 nm.

Referring to FIG. 1, an embodiment of the present invention further provides an edge-lit backlight module including a back plate 1, a reflector 2, a light guide plate 3, an edge light source 4, and an optical film module 5. Specifically, material of the back plate 1 includes any one of iron, aluminum, copper, stainless steel, aluminum alloy, hard plastic, and injection molding colloid, preferably iron; the reflector 2 is disposed on the back plate 1; the light guide plate 3 is disposed on the reflector 2, a lower surface of the light guide plate 3 is provided with a diffuse reflection layer 31, the diffuse reflection layer 31 includes a plurality of dots 311; the edge light source 4 is disposed on the back plate 1 and disposed on a side of the light guide plate 3; the edge light source 4 has a light-exiting surface facing the light guide plate 3 for providing a light source; the optical film module 5 is disposed on the light guide plate 3; wherein the optical purification layer 100 is further provided between the edge light source 4 and the light guide plate 3.

Figure 2:
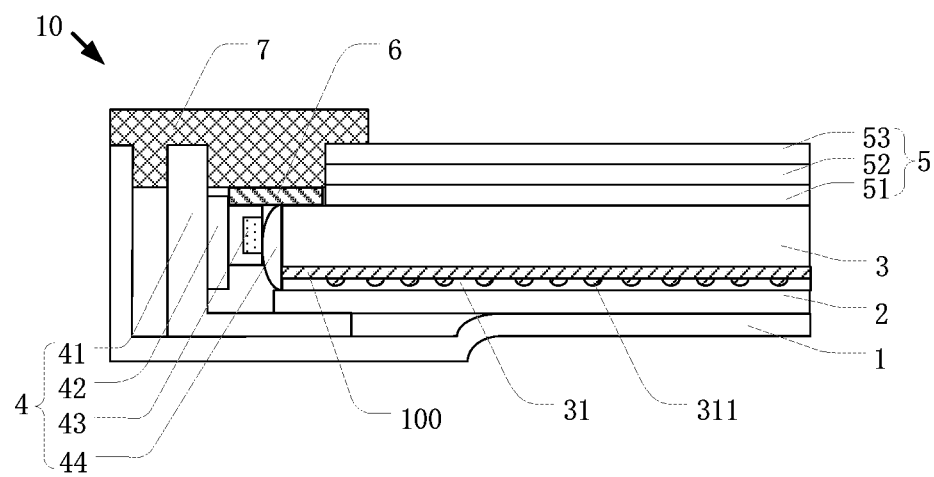
FIG. 2 is a schematic structural diagram of another edge-lit backlight module according to an embodiment of the present invention.

Referring to FIG. 2, in other embodiments, the optical purification layer 100 is disposed between the light guide plate 3 and the diffuse reflection layer. When a white backlight emitted by the edge light source 4 passes through the dots 311, the red light and the blue light in the white backlight can be purified to achieve a wide color gamut.

In other embodiments, the light guide plate 3 includes a material of the optical purification layer 100, which can also achieve purification of red light and blue light in the white backlight to achieve a wide color gamut.

Referring to FIG. 1 and FIG. 2, the edge light source 4 includes a substrate 41, a flexible circuit board 42, a light-emitting chip 43, and a quantum dot light-emitting layer 44, wherein the flexible circuit board 42 is disposed on a side of the substrate 41 facing the light guide plate 3, the light-emitting chip 43 disposed on a side of the flexible circuit board 42 facing away from the substrate 41; and the quantum dot light-emitting layer 44 disposed on a side of the light-emitting chip 43 facing away from the flexible circuit board 42.

The light-emitting chip 43 is preferably a blue light-emitting diode that excites a yellow phosphor to form a white backlight.

A color point of the blue light can be finely adjusted by the blue light-emitting diode in the edge-lit backlight module 10, and a color point specification of the blue light in the DCI-P3 color gamut can be achieved.

Referring to FIG. 1 and FIG. 2, in this embodiment, the edge-lit backlight module 10 further includes a light source reflector 6, and a light shading glue 7; the light source reflector 6 is disposed above a conjunction between the edge light source 4 and the light guide plate 3 for reflecting light of the edge light source 4; the light shading glue 7 is disposed above the edge light source 4 and extending to cover an upper surface of the back plate 1, the light source reflector 6, and a portion of the optical film module 5, such that the light emitted by the edge light source 4 can be shaded better, thus avoiding light leakage.

Referring to FIG. 1 and FIG. 2, in this embodiment, the optical film module 5 includes a diffusor 51, a lower brightness enhancement sheet 52, and an upper brightness enhancement sheet 53. Specifically, the diffusor 51 is disposed on the light guide plate 3; the lower brightness enhancement sheet 52 is disposed on the diffusor 51; and the upper brightness enhancement sheet 53 is disposed on the lower brightness enhancement sheet 52. The optical film module 5 is configured to enhance the brightness and uniformity of the light source. The diffusor 51 can enhance the brightness of the light source. The lower brightness enhancement sheet 52 diffuses light is configured to diffuse light to provide a uniform surface light source. The upper brightness enhancement sheet 53 also enhances the brightness of the light source. The light-emitting effect of the edge-lit backlight module 10 directly affects its visual effect.

Figure 3:
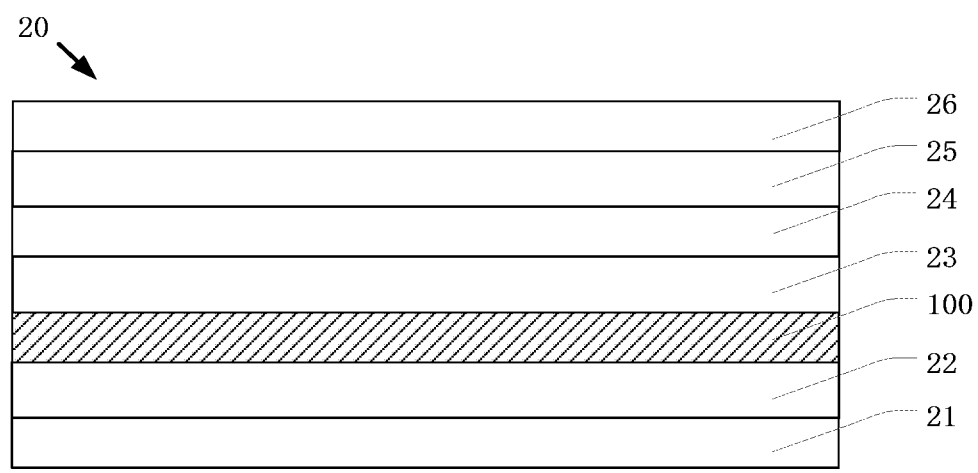
FIG. 3 is a schematic structural diagram of a polarizer according to an embodiment of the present invention.

Referring to FIG. 3, in an embodiment of the present invention, a polarizer 20 is further provided, which includes a stripping protection film 21, an adhesive layer 22, a first protection layer 23, a polarizing sub-layer 24, a second protection layer 25, and a surface protection film 26, which are sequentially laminated from bottom to top. In particular, the adhesive layer 22 is disposed on the stripping protection film 21; the first protection layer 23 is disposed on the adhesive layer 22; the polarizing sub-layer 24 is disposed on the first protection layer 23; the second protection layer 25 is disposed on the polarizing sub-layer 24; the surface protection film 26 is disposed on the second protection layer 25, wherein the optical purification layer 100 is further disposed between any two of adjacent ones of the layers. It can be understood that the optical purification layer 100 can be located between any two of adjacent ones of the layers as schematically illustrated in FIG. 3, instead of being limited as the optical purification layer 100 only located between the adhesive layer and the first protection layer 23.

In other embodiments, the optical purification layer 100 may be used to replace the adhesive layer by uniformly dispersing the phthalocyanine dye in the pressure-sensitive adhesive, which can also meet the effect of bonding.

The present invention has beneficial effects of providing an optical purification layer, an edge-lit backlight module, and a polarizer, which can purify light by absorbing cyan light and yellow orange light through the optical purification layer, which is beneficial to achievement of the DCI-P3 chroma specification. Therefore, a wide color gamut can be realized, the color gamut can achieve 90%-99% of the DCI-P3 color gamut, and a simple process and a low cost are realized. A thermal stability of the optical purification layer is high, and introduction of the optical purification layer is a simple and feasible method for realization of the liquid crystal displays achieving ultimate colors.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. An optical purification layer, comprising an organic absorbing dye for absorbing cyan light and yellow orange light of wavelengths ranging from 560 nm to 610 nm, wherein the organic absorbing dye comprises a phthalocyanine-based dye having the following chemical structural formula:

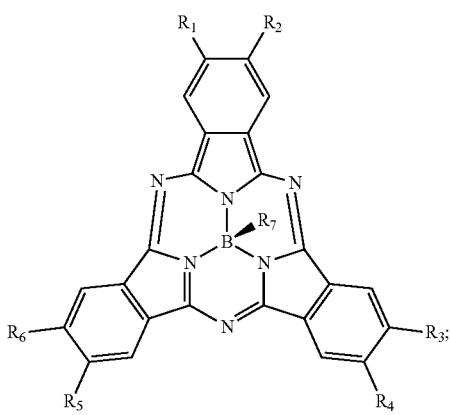

wherein any one of $R_1$-$R_7$ is any one of F, Cl, Br, I or CN; or any one of $R_1$-$R_7$ is any one of $ClO_4^-$, $CF_3SO_3^-$, $CF_2HSO_3^-$, or $CFH_2SO_3^-$; or any one of $R_1$ to $R_7$ is a non-conjugated structure, comprising any one of a linear alkane, a branched alkane, an alkoxy group-containing linear or branched alkane, an ester group-containing chain, and an F-substituted alkane derivative; or any one of $R_1$ to $R_7$ is a conjugated structure bonded through an alkoxy group and an ester group, and the conjugated structure contains a heterocyclic compound comprising a five-membered heterocyclic compound, a six-membered heterocyclic compound, a benzoheterocyclic compound, and a fused ring heterocyclic compound, wherein the five-membered heterocyclic compound comprises furan, thiophene, pyrrole, thiazole or imidazole, the six-membered heterocyclic compound comprises pyridine, pyrazine, pyrimidine or pyridazine, and the fused ring heterocyclic compound comprises indole, quinoline, pteridine or acridine.

2. The optical purification layer according to claim 1, wherein the optical purification layer is prepared by uniformly dispersing the phthalocyanine dye in a photoresist-like mixture composed of an acrylic resin, an acrylic monomer, and a photoinitiator or in a pressure sensitive adhesive.

3. The optical purification layer according to claim 2, wherein the optical purification layer is prepared by scraping or coating.

4. An edge-lit backlight module, comprising:
a back plate;
a reflector disposed on the back plate;
a light guide plate disposed on the reflector, and a lower surface of the light guide plate is provided with a diffuse reflection layer;
an edge light source disposed on the back plate and disposed on a side of the light guide plate, wherein the edge light source has a light-exiting surface facing the light guide plate for providing a light source; and
an optical film module disposed on the light guide plate, wherein the optical purification layer according to claim 2 is provided between the edge light source and the light guide plate.

5. The edge-lit backlight module according to claim 4, wherein the edge light source comprises:
a substrate;
a flexible circuit board disposed on a side of the substrate facing the light guide plate;
a light-emitting chip disposed on a side of the flexible circuit board facing away from the substrate; and
a quantum dot light-emitting layer disposed on a side of the light-emitting chip facing away from the flexible circuit board.

6. The edge-lit backlight module according to claim 4, further comprising:
a light source reflector disposed above a conjunction between the edge light source and the light guide plate for reflecting light of the edge light source; and
a light shading glue disposed above the edge light source and extending to cover an upper surface of the back plate, the light source reflector, and a portion of the optical film module.

7. The edge-lit backlight module according to claim 4, wherein the optical film module comprises:
a diffusor disposed on the light guide plate;
a lower brightness enhancement sheet disposed on the diffusor; and
an upper brightness enhancement sheet disposed on the lower brightness enhancement sheet.

8. An edge-lit backlight module, comprising:
a back plate;
a reflector disposed on the back plate;
a light guide plate disposed on the reflector, and a lower surface of the light guide plate is provided with a diffuse reflection layer;
an edge light source disposed on the back plate and disposed on a side of the light guide plate, wherein the edge light source has a light-exiting surface facing the light guide plate for providing a light source; and
an optical film module disposed on the light guide plate, wherein, the optical purification layer according to claim 2 is further provided between the light guide plate and the diffuse reflection layer.

9. An edge-lit backlight module, comprising:
a back plate;
a reflector disposed on the back plate;
a light guide plate disposed on the reflector, and a lower surface of the light guide plate is provided with a diffuse reflection layer;
an edge light source disposed on the back plate and disposed on a side of the light guide plate, wherein the edge light source has a light-exiting surface facing the light guide plate for providing a light source; and
an optical film module disposed on the light guide plate, wherein, the light guide plate comprises a material of the optical purification layer according to claim 2.

10. The optical purification layer according to claim 1, wherein the optical purification layer has a film thickness ranging from 500 nm to 20,000 nm.

11. A polarizer, comprising:
a stripping protection film;
an adhesive layer disposed on the stripping protection film;
a first protection layer disposed on the adhesive layer;
a polarizing sub-layer disposed on the first protection layer;
a second protection layer disposed on the polarizing sub-layer; and
a surface protection film disposed on the second protection layer,
wherein the optical purification layer according to claim 1 is provided between any two of adjacent ones of the layers.

* * * * *